US012762245B2

(12) United States Patent
He et al.

(10) Patent No.: US 12,762,245 B2
(45) Date of Patent: Oct. 13, 2026

(54) METHOD, APPARATUS, ELECTRONIC DEVICE AND STORAGE MEDIUM OF REMOTE ATTESTATION

(71) Applicant: Beijing Zitiao Network Technology Co., Ltd., Beijing (CN)

(72) Inventors: Peixuan He, Beijing (CN); Lu Yan, Beijing (CN); Yao Zhang, Beijing (CN); Ye Wu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 122 days.

(21) Appl. No.: 18/961,331

(22) Filed: Nov. 26, 2024

(65) Prior Publication Data

US 2025/0217491 A1 Jul. 3, 2025

(30) Foreign Application Priority Data

Dec. 29, 2023 (CN) ........................ 202311864003.5

(51) Int. Cl.
*G06F 21/57* (2013.01)

(52) U.S. Cl.
CPC .................................. *G06F 21/575* (2013.01)

(58) Field of Classification Search
CPC ..................................................... G06F 9/4416
See application file for complete search history.

(56) References Cited

U.S. PATENT DOCUMENTS 7,930,733 B1 * 4/2011 Iftode .................. G06F 21/575 713/168
11,416,616 B2 8/2022 Kliewer et al.
(Continued)

FOREIGN PATENT DOCUMENTS

CN 101350044 A 1/2009
CN 110263545 A 9/2019
(Continued)

OTHER PUBLICATIONS

Notification to Grant Patent Right for Invention for Chinese Patent Application No. 202311864003.5, mailed on Dec. 6, 2024, 6 pages.
(Continued)

*Primary Examiner* — Phil K Nguyen
(74) *Attorney, Agent, or Firm* — Astute IP Law Group

(57) ABSTRACT

The present disclosure provides a method, an apparatus, an electronic device, and a storage medium of remote attestation. The method is applied to a first trusted execution environment, and includes: obtaining a first file for a first application, the first file being used to deploy the first application in the first trusted execution environment, and the first file including a read-only target file system; obtaining a first metric value for the target file system; loading the first file, and writing the first metric value into a command line for booting a kernel, and booting a kernel in the first file based on the command line, to deploy the first application in the first trusted execution environment; and measuring the kernel and other components to obtain a second metric value, and performing remote attestation on the first application based on the second metric value.

19 Claims, 3 Drawing Sheets

(56) References Cited

U.S. PATENT DOCUMENTS

| | | | | |
|---|---|---|---|---|
| 2015/0007262 | A1* | 1/2015 | Aissi | G06F 21/60 726/2 |
| 2017/0011219 | A1* | 1/2017 | Li | H04L 9/3234 |
| 2023/0009088 | A1 | 1/2023 | Brown et al. | |
| 2023/0342472 | A1* | 10/2023 | Shao | G06F 21/74 |
| 2024/0264822 | A1* | 8/2024 | Hwangbo | G06F 8/65 |
| 2025/0077676 | A1* | 3/2025 | Berrangé | G06F 9/4401 |
| 2025/0123814 | A1* | 4/2025 | Mcmorran | G06N 3/044 |
| 2025/0238251 | A1* | 7/2025 | Orsini | G06F 9/45558 |

FOREIGN PATENT DOCUMENTS

| | | | |
|---|---|---|---|
| CN | 112468473 | A | 3/2021 |
| CN | 114327791 | A | 4/2022 |
| CN | 114629639 | A | 6/2022 |
| CN | 114995894 | A | 9/2022 |
| CN | 116502188 | A | 7/2023 |
| CN | 117834627 | B | 12/2024 |
| JP | 2017515208 | A | 6/2017 |
| WO | 2023165367 | A1 | 9/2023 |
| WO | 2024179285 | A1 | 9/2024 |

OTHER PUBLICATIONS

International Search Report for International Application No. PCT/CN2024/132764, mailed on Feb. 12, 2025, 8 pages.

Yang et al., “Implementation of Linux Checkpoint Mechanism Supporting File Migration”, Computer Engineering, vol. 36, No. 3, Feb. 28, 2010, 3 pages, with English Abstract.

Office Action for Chinese Patent Application No. 202311864003.5, mailed on Sep. 19, 2024, 13 pages.

Arronwy, “[RFC] Proposal for Measured Boot Image/Rootfs #40”, Github, Available online at: <https://github.com/confidential-containers/documentation/issues/40>, Jul. 26, 2022, 14 pages.

Office Action for Japanese Patent Application No. 2025-572163, mailed on Aug. 12, 2026, 9 pages.

* cited by examiner

METHOD, APPARATUS, ELECTRONIC DEVICE AND STORAGE MEDIUM OF REMOTE ATTESTATION

CROSS REFERENCE

This application claims priority of Chinese Patent Application No. 202311864003.5, filed on Dec. 29, 2023, entitled 'Method, Apparatus, Electronic Device and Storage Medium of Remote Attestation'.

FIELD

The present disclosure relates to the field of computer technologies, and in particular, to a method, apparatus, an electronic device and a storage medium of remote attestation.

BACKGROUND

To implement trusted computing, it is required that a computing program runs in a TEE (Trusted Execution Environment). The TEE is a secure area of a processor, and establishes an isolated execution environment. The isolated execution environment provides security features, such as isolated execution, integrity of an application running in the TEE, and confidentiality of its assets.

To implement communication between a plurality of TEE trusted applications, remote attestation is required to verify that the applications run on a secure trusted execution environment platform and that logic of the applications is not tampered with. During remote attestation, a metric value returned based on an attestation process needs to be compared with a reference value determined based on source code/images provided by a service provider, so as to determine a remote attestation result.

However, in the related art, code and data in an operating system cannot be measured, resulting in that a user cannot verify whether a current application is consistent with that generated by the service provider.

SUMMARY

In view of the above, an objective of the present disclosure is to provide a method, an apparatus, an electronic device and a storage medium of remote attestation.

Based on the above objective, a first aspect of the present disclosure provides a method of remote attestation, applied to a first trusted execution environment, the method comprising:

obtaining a first file for a first application, the first file being used to deploy the first application in the first trusted execution environment, and the first file comprising a read-only target file system;

obtaining a first metric value for the target file system;

loading the first file, and writing the first metric value into a command line for booting a kernel, and booting a kernel in the first file based on the command line, to deploy the first application in the first trusted execution environment; and measuring the kernel and other components to obtain a second metric value, and performing remote attestation on the first application based on the second metric value.

In some embodiments, the first file comprises a virtual machine image file, and the virtual machine image file comprises service information, component information for the first application, and environment information in which the first application runs.

In some embodiments, the target file system is a root file system.

In some embodiments, booting, based on the command line, the kernel to execute the first file comprises:

verifying the first metric value by the kernel; and measuring the kernel in accordance with the first metric value being correct.

In some embodiments, verifying the first metric value by the kernel comprises:

during a process of booting the kernel in the first file, measuring the target file system in the first file to obtain a third metric value;

determining whether the third metric value is the same as the first metric value; and determining that the first metric value is correct in accordance with the third metric value being the same as the first metric value.

In some embodiments, measuring the kernel and the other components to obtain the second metric value comprises:

measuring a kernel image of the kernel, the command line and the other components to generate the second metric value, the second metric value comprising one metric value or a combination of a plurality of metric values; and storing the second metric value in a register matching the first trusted execution environment.

In some embodiments, performing the remote attestation on the first application based on the second metric value comprises:

receiving a remote attestation request sent by a second application, the second application running in a second trusted execution environment;

generating, based on the remote attestation request, remote attestation evidence comprising the second metric value; and sending the remote attestation evidence to the second application or a remote attestation service, to cause the second application or the remote attestation service to obtain the second metric value from the remote attestation evidence, and verify the first application based on the second metric value.

In some embodiments, the remote attestation evidence comprises a remote attestation report, the second metric value is stored in the remote attestation report, the method further comprises:

obtaining, by the second application or the remote attestation service, code information for the first application running in the first trusted execution environment and related information of the first file, and obtaining a fourth metric value based on the code information and the related information, wherein a measurement method for the fourth metric value is the same as a measurement method for the second metric value; and verifying the first application based on the second metric value comprising:

verifying the second metric value and the fourth metric value based on a predetermined verification policy, to obtain a remote attestation result for the first application.

In some embodiments, the remote attestation evidence comprises a remote attestation report and a log file of a boot stage of the first file, the second metric value is stored in the remote attestation report, the method further comprises:

obtaining the second metric value based on the remote attestation report;

obtaining an intermediate metric value of the boot stage of the first file based on the log file, and calculating a fifth metric value based on the intermediate metric value;

verifying the first application based on the second metric value comprising:

verifying the second metric value and the fifth metric value based on a predetermined verification policy, to obtain a remote attestation result for the first application.

In some embodiments, before obtaining the intermediate metric value of the boot stage of the first file based on the log file, and calculating the fifth metric value based on the intermediate metric value, further comprises:

obtaining, by the second application or the remote attestation service, code information for the first application running in the first trusted execution environment and related information of the first file, and calculating first log information at system bootup based on the code information and the related information;

determining whether the first log information is consistent with second log information in the log file; and in accordance with the first log information being consistent with the second log information in the log file, calculating the fifth metric value based on the log file.

In some embodiments, the method further comprises:

obtaining an encryption block file;

interacting with a provider of the encryption block file by using an encryption storage service in the target file system to obtain a decryption key of the encryption block file;

decrypting the encryption block file based on the decryption key to obtain a decryption block file; and mounting the decryption block file in a system of the first trusted execution environment, and responding to a write request for the first application based on the decryption block file.

A second aspect of the present disclosure provides an apparatus of remote attestation, comprising:

a first obtaining module configured to obtain a first file for a first application, the first file being used to deploy the first application in a first trusted execution environment, and the first file comprising a read-only target file system;

a second obtaining module configured to obtain a first metric value for the target file system;

a boot module configured to load the first file, and write the first metric value into a command line for booting a kernel, and boot a kernel in the first file based on the command line, to deploy the first application in the first trusted execution environment; and a measurement module configured to measure the kernel and other components to obtain a second metric value, and perform remote attestation on the first application based on the second metric value.

A third aspect of the present disclosure provides an electronic device, comprising a memory, a processor, and a computer program stored in the memory and executable on the processor, wherein the program, when executed by the processor, implements the method of remote attestation according to the first aspect.

A fourth aspect of the present disclosure provides a non-transitory computer-readable storage medium, wherein the non-transitory computer-readable storage medium stores computer instructions for causing the computer to perform the method of remote attestation according to the first aspect.

It can be seen from the foregoing descriptions that in the method, the apparatus, the electronic device, and the storage medium of remote attestation provided in the present disclosure, when performing a remote attestation on the first application by using the second metric value, the second metric value is generated based on a measurement result on the kernel. In other words, in the present application, the second metric value is an overall measurement of an operating system in which the first application runs. During remote attestation, if a remote attestation result of the operating system including the first application is passed, that is, the operating system including the first application is complete and secure, it indicates that the first application running in the operating system is also complete and secure. In addition, the kernel is booted based on the command line including the first metric value of the target file system. Therefore, the second metric value is generated based on the first metric value of the target file system. The target file system is a file system mounted on an initial root file system (initial RAM disk, initrd). The target file system manages data, metadata, files, and the like of the operating system and the first application running in the operating system. Therefore, measurement of application layer code of a confidential virtual machine can be implemented by using the second metric value generated based on the first metric value of the target file system, and trust transfer from the initial root file system (initrd) to the operating system (OS) is completed during measurement, so that when remote attestation is performed through remote attestation, security of the first trusted execution environment and integrity of running code and data can be verified.

BRIEF DESCRIPTION OF THE DRAWINGS

To more clearly describe the technical solutions in the present disclosure or the related art, the following briefly describes the accompanying drawings for describing the embodiments or the related art. Apparently, the accompanying drawings in the following description show merely some embodiments of the present disclosure, and a person of ordinary skill in the art may still derive other drawings from these accompanying drawings without creative efforts.

DETAILED DESCRIPTION

Figure 1:
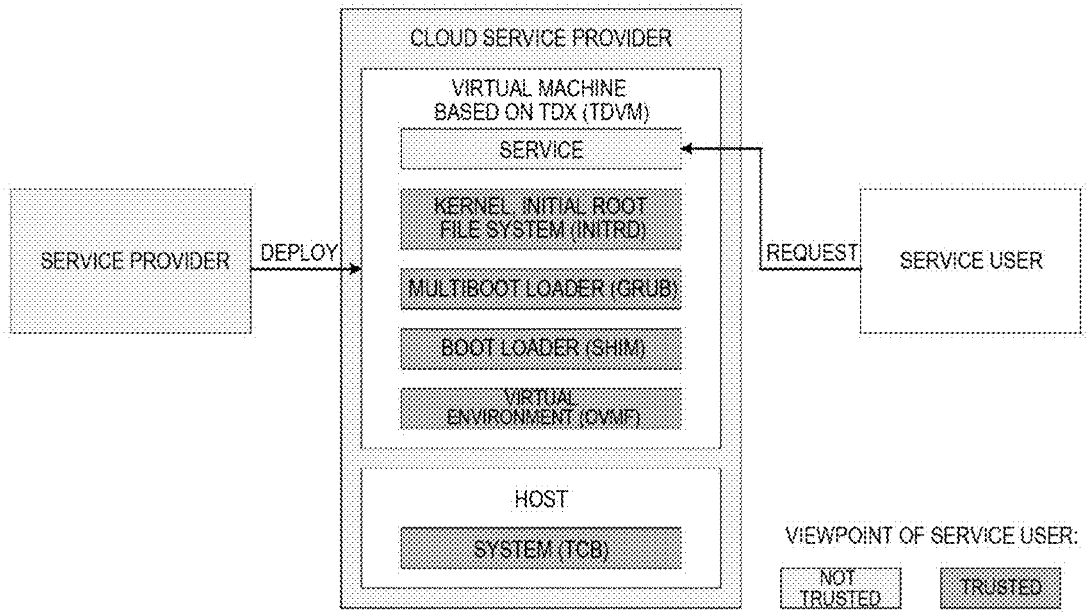
FIG. 1 shows a schematic diagram of hardware trust of an example method of remote attestation according to an embodiment of the present disclosure.

To make the objectives, technical solutions, and advantages of the present disclosure clearer, the present disclosure is further described in detail below with reference to specific embodiments and the accompanying drawings.

It should be noted that, unless otherwise defined, the technical terms or scientific terms used in the embodiments of the present disclosure shall have the general meanings understood by those of ordinary skill in the art to which the present disclosure belongs. The "first", "second", and similar words used in the embodiments of the present disclosure do not denote any order, quantity, or importance, but are merely used to distinguish different components. The similar words such as "include" or "have" mean that an element or object preceding the word covers an element or object listed after the word and equivalents thereof, but do not exclude other elements or objects. The similar words such as "connect" or "in connection" are not limited to physical or mechanical connections, but may include electrical connections, either directly or indirectly. "Upper", "lower", "left", "right", and the like are only used to indicate a relative positional relationship. When the absolute position of an object described changes, the relative positional relationship may also change accordingly.

In the field of distributed computing environments, cloud computing is becoming increasingly important as a way to achieve more flexible, more scalable, and more efficient systems. However, as users of cloud computing services lose direct control over data and applications hosted by cloud providers, the trustworthiness of cloud services has become a major problem that hinders the deployment of cloud applications.

To attract users to use cloud services, cloud service providers provide trusted services to assure users that data and applications provided to the service remain secure and protected, and that the service will use the data and applications only as expected by the users.

The trusted services can be developed using trusted execution environments (TEEs), such as Intel SGX, TDX, AMD SEV, ARM TrustZone, etc. The trusted execution environment is a hardware-based security technology. By dividing a secure area in a CPU as the trusted execution environment, a secure computing environment isolated from the outside is constructed, which can ensure the confidentiality and integrity of data and code loaded therein. A trusted application running in the trusted execution environment can access all functions of a device's main processor and memory, and hardware isolation protects these components from user-installed applications running in a main operating system.

The TDX is a confidential virtualization technology that isolates confidential virtual machines from non-confidential domain software stacks (including a virtual machine monitor, hypervisor, VMM, and other non-trusted domain software stacks) to ensure that data of the confidential virtual machines cannot be obtained and modified by the non-confidential domain software.

The SEV is a virtual machine memory encryption technology that aims to isolate virtual machines from untrusted other virtual machines and hypervisors. The SEV includes two derived technologies: SEV-ES (Encrypted State) and SEV-SNP (Secure Nested Paging). The SEV-ES adds secure encryption of virtual machine register states on the basis of the SEV, and the SEV-SNP adds stronger memory integrity protection to the virtual machine, which can prevent active attacks from the hypervisor.

The confidential virtual machine is a virtual machine deployed based on a trusted execution environment technology such as TDX, SEV, or CSV.

The trusted execution environment technology provides a remote attestation mechanism during implementation. A requester initiates a remote attestation request to a trusted application, and the application can obtain a remote attestation report and provide the remote attestation report to the requester. By verifying the remote attestation report, the requester can confirm that the application runs on a trusted hardware platform and the running logic of the application is not modified, thereby ensuring data security.

The remote attestation report usually includes an application metric value. The application metric value is a hash value calculated based on code and data of the application, and can be used to verify an identity and integrity of the application. During remote attestation, the requester receives the remote attestation report sent by the application and obtains the application metric value from the remote attestation report, and then compares the application metric value with a pre-obtained reference metric value. The reference metric value can be reproduced according to source code and an image published by a service provider. If the application metric value is consistent with the reference metric value, it indicates that the integrity of the application is not compromised.

However, in the related art, during remote attestation, code and data in the operating system cannot be measured, resulting in that a user cannot verify whether a service currently provided by the application is consistent with a service provided by the service provider.

As shown in FIG. 1, for measurement based on remote attestation in a TDX environment, the trust chain is as follows: firmware (OVMF)→boot loader (Shim)→multiboot loader (Grub)→kernel (Kernel)→initial root file system (initrd)→operating system (OS). That is, to ensure that the operating system (OS) is trusted, it is required to ensure that the initial root file system (initrd) is trusted; to ensure that the initial root file system (initrd) is trusted, it is required to ensure that the kernel (Kernel) is trusted; to ensure that the kernel (Kernel) is trusted, it is required to ensure that the multiboot loader (Grub) is trusted; to ensure that the multiboot loader (Grub) is trusted, it is required to ensure that the boot loader (Shim) is trusted; and to ensure that the boot loader (Shim) is trusted, it is required to ensure that the firmware (OVMF) is trusted.

For measurement in the TDX environment, the related art only measures up to the initial root file system (initrd), and the trust chain is also only transferred to the initial root file system (initrd), that is, trust transfer from the initial root file system (initrd) to the operating system (OS) is lacking, which causes a service user (Service User) to be unable to verify whether a current service (Service) is consistent with a service claimed by a service provider (Service Provide).

Figure 2:
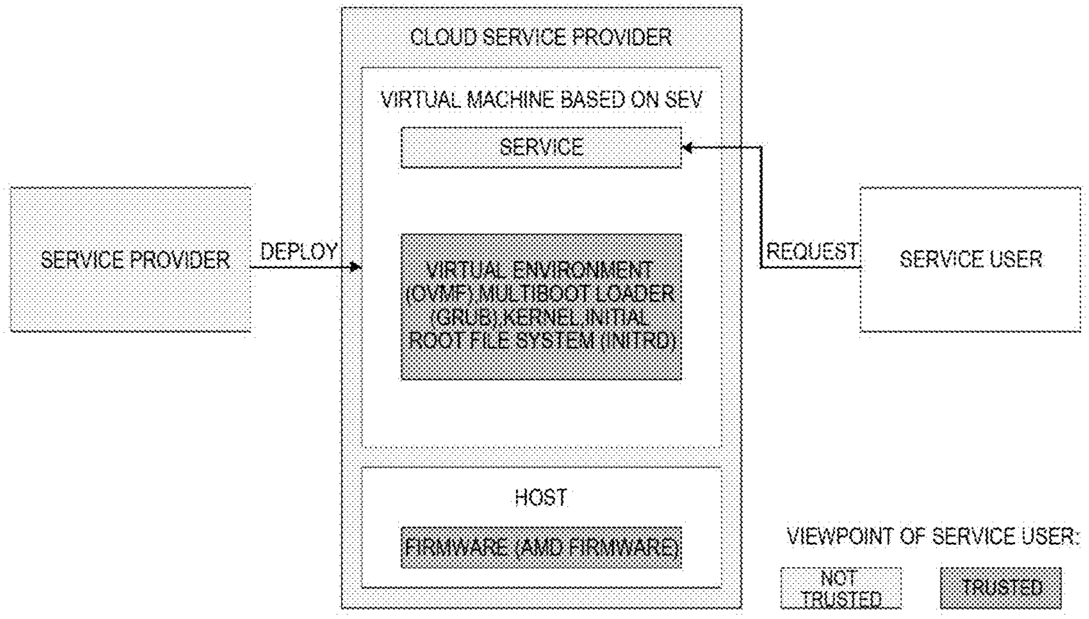
FIG. 2 shows a schematic diagram of hardware trust of an example method of remote attestation according to an embodiment of the present disclosure.

As shown in FIG. 2, for measurement based on remote attestation in an SEV environment, the trust chain is as follows: firmware (OVMF)→multiboot loader (Grub)→kernel (Kernel)→initial root file system (initrd)→operating system (OS). That is, to ensure that the operating system (OS) is trusted, it is required to ensure that the initial root file system (initrd) is trusted; to ensure that the initial root file system (initrd) is trusted, it is required to ensure that the kernel (Kernel) is trusted; to ensure that the kernel (Kernel) is trusted, it is required to ensure that the multiboot loader (Grub) is trusted; and to ensure that the multiboot loader (Grub) is trusted, it is required to ensure that the firmware (OVMF) is trusted.

For measurement in the SEV environment, the related art only measures up to the initial root file system (initrd), and the trust chain is also only transferred to the initial root file system (initrd), that is, trust transfer from the initial root file system (initrd) to the operating system (OS) is lacking, which causes a service user (Service User) to be unable to verify whether a current service (Service) is consistent with a service claimed by a service provider (Service Provide).

In view of this, the present disclosure provides a method of remote attestation to solve the above problems.

The method of remote attestation is applied to a first trusted execution environment. The first trusted execution environment may be a trusted execution environment such as SGX, TDX, SEV, SEV-ES, SEV-SNP, or ARM TrustZone. This embodiment is not limited thereto.

Figure 3:
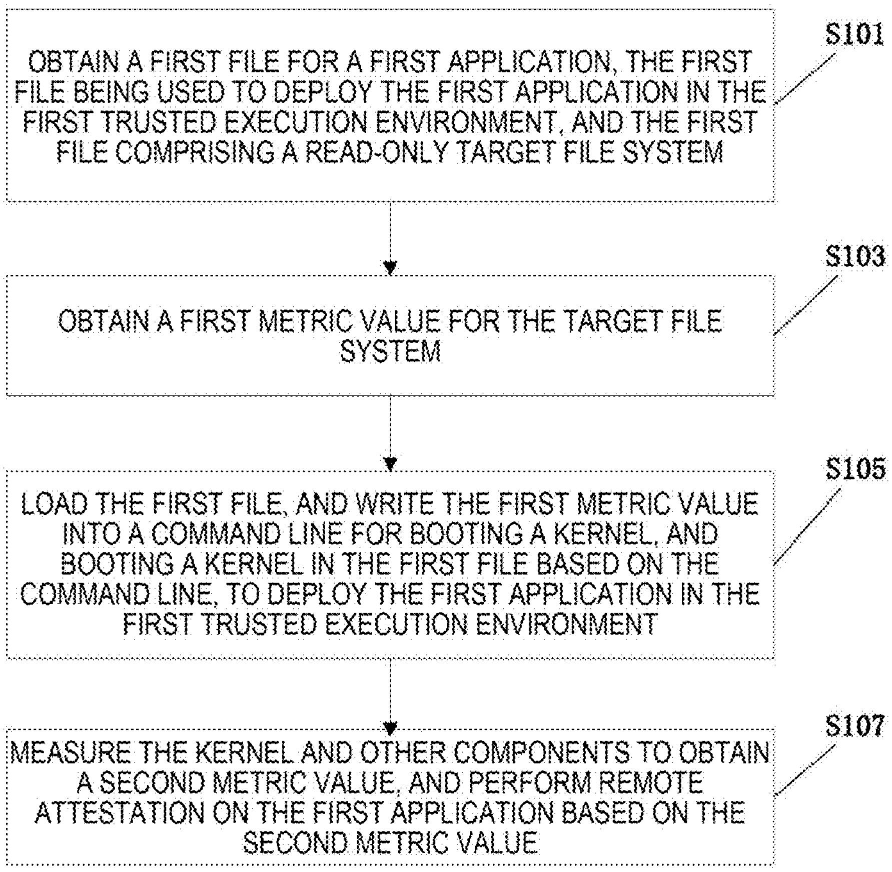
FIG. 3 shows a schematic flowchart of an example method according to an embodiment of the present disclosure.

As shown in FIG. 3, the method of remote attestation includes the following steps:

Step S101: obtain a first file for a first application, the first file being used to deploy the first application in the first trusted execution environment, and the first file comprising a read-only target file system.

Step S103: obtain a first metric value for the target file system.

Wherein, the first file for the first application and the first metric value for the target file system may be provided by a service provider, or may be generated in another manner. This embodiment is not limited thereto.

In this embodiment, the service provider needs to create the first file for deploying the first application, and provide the first file to a cloud service provider (CSP) that needs to deploy the first application. The cloud service provider provides a cloud server including the first trusted execution environment, to deploy the first application based on the first file.

In addition, the service provider also measures the target file system in the first file, to obtain the first metric value of the target file system, and provide the first metric value to the cloud service provider. In some embodiments, the first metric value may be a hash value.

In this embodiment, the target file system of the first file is set as read-only, so that it can be ensured that the first metric value obtained based on the target file system is consistent, and does not change due to normal running of the operating system, thereby ensuring that when remote attestation is subsequently performed using the first metric value of the target file system, there is no adverse effect due to normal running of the operating system.

Step S105: load the first file, and write the first metric value into a command line for booting a kernel, and booting a kernel in the first file based on the command line, to deploy the first application in the first trusted execution environment.

In this embodiment, the kernel is a part of the first file. When the service provider deploys the first application on the cloud server including the first trusted execution environment, the first file needs to be loaded, and the kernel in the first file is booted during the process of loading the first file, to implement deployment of the first application in the first trusted execution environment.

A kernel is the core of an operating system, which is the first-level software expansion based on hardware, and it provides the most basic functions of the operating system, it is the basis of the operating system operation, and it is responsible for managing processes, memory, device driver programs, files, and the network system of the system, and determining the performance and stability of the system.

The kernel may be a kernel carried in the first file, or may be a new kernel specified in the boot stage. This embodiment is not limited thereto.

Before the kernel is booted, the first metric value of the target file system needs to be written into the command line when the kernel is booted, and the command line including the first metric value of the target file system is used to configure and control the behavior of the kernel during the kernel startup, to implement the kernel bootup.

Step S107: measure the kernel and other components to obtain a second metric value, and perform remote attestation on the first application based on the second metric value.

The other components may include OVMF firmware, Grub, etc. This embodiment is not limited thereto.

In this embodiment, because the command line used to boot the kernel includes the first metric value, that is, the process of booting the kernel is affected by the first metric value, and the kernel image obtained after the kernel is booted is also affected by the first metric value. Therefore, when the kernel and components such as the OVMF firmware and Grub are measured, the measurement is actually performed on the kernel and the components such as the OVMF firmware and Grub that are affected by the first metric value. Therefore, the second metric value obtained by measuring the kernel and the components such as the OVMF firmware and Grub is generated based on the first metric value, that is, generated based on a metric result of the target file system.

In this case, when the remote attestation is performed on the first application by using the second metric value, the second metric value is generated based on a measurement result of the kernel. In other words, in the present application, the second metric value is an overall measurement of an operating system in which the first application runs. During remote attestation, if a remote attestation result of the operating system including the first application is passed, that is, the operating system including the first application is complete and secure, it indicates that the first application running in the operating system is also complete and secure. In addition, the kernel is booted based on the command line including the first metric value of the target file system. Therefore, the second metric value is generated based on the first metric value of the target file system. The target file system is a file system mounted on an initial root file system (initrd). The target file system manages data, metadata, files, and the like of the operating system and the first application running in the operating system. Therefore, measurement of application layer code of a confidential virtual machine can be implemented by using the second metric value generated based on the first metric value of the target file system, and trust transfer from the initial root file system (initrd) to the operating system (OS) is completed during measurement, so that when remote attestation is performed through remote attestation, security of the first trusted execution environment and integrity of running code and data can be verified.

In some embodiments, the first file comprises a virtual machine image file, and the virtual machine image file comprises service information for the first application, component information, and environment information in which the first application runs. The environment information in which the first application runs may be an operating system in which the first application runs. Deployment of the first application in firmware can be implemented through the virtual machine image file.

In some embodiments, the target file system is a root file system (rootfs) of the first file. The root file system not only has a function of storing data files of a general file system, but also is a first file system mounted when a kernel is booted. An image file of kernel code is stored in the root file system, and a system boot loader loads some initialization scripts (such as rcS and inittab) and services from the root file system after the root file system is mounted, and then runs the initialization scripts and the services in a memory. In addition, the root file system includes necessary files for system boot and mounting other file systems, such as directories and key files that are necessary for booting the operating system.

Therefore, in the embodiments of the present disclosure, according to the first metric value of the read-only root file system, the first metric value of the read-only root file system is written into the command line when the kernel is booted, the kernel is booted based on the command line including the first metric value of the read-only root file system, the second metric value is obtained by measuring the kernel including the first metric value and components such as the OVMF firmware and Grub, and then remote attestation is performed by using the second metric value. Therefore, measurement of application layer code of a confidential virtual machine is implemented based on a measurement result of the read-only root file system, and trust transfer from the initial root file system (initrd) to the operating system (OS) is completed during measurement, so that when remote attestation is performed through remote attestation, security of the first trusted execution environment and integrity of running code and data can be verified.

In some embodiments, the booting, based on the command line, the kernel in the first file in step S105 includes the following step:

Step S201: verify the first metric value by the kernel.

Wherein, verifying the first metric value by the kernel in step S201 includes the following step:

Step S301: during a process of booting the kernel in the first file, measuring the target file system in the first file to obtain a third metric value.

In this embodiment, a virtual machine is booted by using a kernel with a metric value verification capability, and the first metric value is verified during the process of booting the virtual machine.

In some embodiments, during the process of booting the virtual machine, a measurement tool associated with the kernel may be used to measure all files (including its own service code) under the target file system in the first file, to obtain the third metric value. When the first metric value is a hash value, the measurement tool is a tool including a capability of verifying a hash value of the target file system.

In some embodiments, the third metric value may be obtained by using the same measurement tool as that used by the service provider to obtain the first metric value, to ensure that the measurement processes of the first metric value and the third metric value are the same, so that the first metric value is the same as the third metric value when the target file system is the same.

In some embodiments, when the service provider obtains the first metric value by using the measurement tool, a hash tree of files in a rootfs of the virtual machine image may be generated, and a hash value of a root node is used as the first metric value of the read-only root file system.

Step S303: determine whether the third metric value is the same as the first metric value.

Step S305: determine that the first metric value is correct in accordance with the third metric value being the same as the first metric value.

After the third metric value is obtained, the third metric value obtained through measurement by using the measurement tool is compared with the first metric value provided by the service provider. If the third metric value is the same as the first metric value, it indicates that the target file system does not change, and the first metric value is correct.

Step S203: measure the kernel if the first metric value is correct.

In this embodiment, if the target file system does not change, the first metric value is correct, and the kernel and the virtual machine can be booted, so that the kernel can be measured to obtain the second metric value. If the target file system changes, the third metric value is different from the first metric value, that is, the first metric value is incorrect, and the first trusted execution environment refuses the access, and the virtual machine cannot be booted, and therefore the first application cannot be deployed in the first trusted execution environment.

In some embodiments, measuring the kernel and the other components to obtain the second metric value in step S107 includes the following steps:

Step S401: measure a kernel image of the kernel, the command line and the other components to generate the second metric value, the second metric value comprising one metric value or a combination of a plurality of metric values.

Step S403: store the second metric value in a register matching the first trusted execution environment.

In this embodiment, measuring the kernel and other components after the bootup is completed includes measuring the kernel image of the kernel, the command line of the kernel, and components such as the OVMF firmware and Grub. The second metric value obtained after measurement is written into a register. Because register types of different CPUs are different, and storage requirements of different types of registers are different, for different types of trusted execution environments provided by different CPU devices, methods of writing the second metric value into the register are different. In this embodiment, it is necessary to determine a register type corresponding to the first trusted execution environment, and write the second metric value into the register in a manner matching the register type corresponding to the first trusted execution environment. When remote attestation needs to be performed, the second metric value is taken out from the register and then written into a remote attestation report, to implement remote attestation on the first application based on the remote attestation report.

Because register types corresponding to different trusted execution environments are different, and different trusted execution environments may provide a plurality of registers, thus the second metric value is generated and stored in different manners. In this embodiment, the second metric value is calculated and stored according to storage requirements required by each of the types of the registers, to meet remote attestation in different types of trusted execution environments.

In some embodiments, performing the remote attestation on the first application based on the second metric value in step S107 includes the following steps:

Step S601: receive a remote attestation request sent by a second application, the second application running in a second trusted execution environment.

In this embodiment, the first application runs in the first trusted execution environment, and the second application runs in the second trusted execution environment. The first trusted execution environment and the second trusted execution environment may be deployed on a same trusted computing node, or the first trusted execution environment and the second trusted execution environment may be deployed on different trusted computing nodes. This specification does not impose any limitation thereon. The first trusted execution environment and the second trusted execution environment may be a same trusted execution environment, or the first trusted execution environment is different from the second trusted execution environment. This embodiment does not impose any limitation thereon.

In this embodiment, when the second application wants to perform remote attestation on the first application, the second application may generate a request value and send the request value to the first application, to initiate a remote attestation request to the first application. The request value may be a random number generated by the second application.

Step S603: generate, based on the remote attestation request, remote attestation evidence comprising the second metric value.

After receiving the request value sent by the second application, the first application obtains the second metric value from the register based on the remote attestation request initiated by the second application, and generates remote attestation evidence including the second metric value. The remote attestation evidence may include a remote attestation report, and the second metric value is stored in the remote attestation report.

The second application may obtain the remote attestation evidence returned by the first application. The remote attestation evidence is used to implement remote attestation on the first application. The remote attestation may include an attestation of a running environment of the first application, and/or an attestation of integrity of code and a running logic of the application.

Step S605: send the remote attestation evidence to the second application, to cause the second application to obtain the second metric value from the remote attestation evidence, and verify the first application based on the second metric value.

In this embodiment, when the second application does not trust a third party, after obtaining the remote attestation evidence, the first application may directly send the remote attestation evidence to the second application. The second application may obtain the second metric value from the remote attestation evidence, to verify the first application by using the second metric value.

The verification process includes: obtain, by the second application, code information for the first application running in the first trusted execution environment and related information of the first file disclosed by the service provider, and obtaining a fourth metric value based on the these information, wherein a measurement method for the fourth metric value is the same as a measurement method for the second metric value. The related information of the first file is information related to the virtual machine image file.

Verifying the first application based on the second metric value in step S605 includes: verifying the second metric value and the fourth metric value based on a predetermined verification policy, to obtain a remote attestation result for the first application.

In this embodiment, the service provider may disclose the code information for the first application running in the first trusted execution environment and the related information of the first file to the second application in advance. After obtaining the information, the second application may run a verification client locally, and run the code information by using the verification client to reproduce the fourth metric value corresponding to the second metric value, and then verify the second metric value and the fourth metric value based on the predetermined verification policy, to obtain the remote attestation result for the first application.

In some embodiments, performing remote attestation on the first application based on the second metric value in step S107 includes the following steps:

Step S701: receive a remote attestation request sent by a second application, the second application running in a second trusted execution environment.

In this embodiment, the first application runs in the first trusted execution environment, and the second application runs in the second trusted execution environment. The first trusted execution environment and the second trusted execution environment may be deployed on a same trusted computing node, or the first trusted execution environment and the second trusted execution environment may be deployed on different trusted computing nodes. This specification does not impose any limitation thereon. The first trusted execution environment and the second trusted execution environment may be a same trusted execution environment, or the first trusted execution environment is different from the second trusted execution environment. This embodiment does not impose any limitation thereon.

In this embodiment, when the second application wants to perform remote attestation on the first application, the second application may generate a request value and send the request value to the first application, to initiate a remote attestation request to the first application. The request value may be a random number generated by the second application.

Step S703: generate, based on the remote attestation request, remote attestation evidence comprising the second metric value.

After receiving the request value sent by the second application, the first application obtains the second metric value from the register based on the remote attestation request initiated by the second application, and generates remote attestation evidence including the second metric value. The remote attestation evidence may include a remote attestation report, and the second metric value is stored in the remote attestation report.

The second application may obtain the remote attestation evidence returned by the first application. The remote attestation evidence is used to implement remote attestation on the first application. The remote attestation may include an attestation of a running environment of the first application, and/or an attestation of integrity of code and a running logic of the application.

Step S705: send the remote attestation evidence to a remote attestation service, to cause the remote attestation service to obtain the second metric value from the remote attestation evidence, and verify the first application based on the second metric value.

In this embodiment, when the second application trusts the remote attestation service, after obtaining the remote attestation evidence, the first application may send the remote attestation evidence to the second application, and then the second application sends the remote attestation evidence to the remote attestation service. The remote attestation service may obtain the second metric value from the remote attestation evidence, to verify the first application by using the second metric value.

The verification process includes: obtain, by the remote attestation service, code information for the first application running in the first trusted execution environment and related information of the first file, and obtain a fourth metric value based on the code information and the related information, wherein a measurement method for the fourth metric value is the same as a measurement method for the second metric value. The code information for the first application running in the first trusted execution environment and the related information of the first file may be provided and disclosed by the service provider, or may be generated in another manner. This embodiment is not limited thereto.

Verifying the first application based on the second metric value in step S705 includes: verifying the second metric value and the fourth metric value based on a predetermined verification policy, to obtain a remote attestation result for the first application.

In this embodiment, the service provider may disclose the code information for the first application running in the first trusted execution environment and the related information of the first file to the remote attestation service in advance. After obtaining the code information and the related information, the remote attestation service runs the code information and the related information to reproduce the fourth metric value corresponding to the second metric value, and then verifies the second metric value and the fourth metric value based on the predetermined verification policy, to obtain the remote attestation result for the first application.

In some embodiments, the remote attestation report may further include a hardware signature. After obtaining the remote attestation report, the second application or the remote attestation service may obtain the hardware signature in the remote attestation report, and verify the hardware signature in the remote attestation report, to determine whether the remote attestation report is a remote attestation report that meets a predetermined condition, thereby determining whether the remote attestation report is a remote attestation report generated by a trusted application running in a trusted execution environment. The second metric value is obtained for remote attestation only when the remote attestation report is the remote attestation report generated by the trusted application running in the trusted execution environment.

In some embodiments, the remote attestation evidence may further include additional information. The additional information may include information such as a public key of the first application or a random number generated by the second application. This embodiment is not limited thereto.

In addition, the second application or the remote attestation service may further obtain, from the remote attestation report, first information such as the public key of the first application or the random number generated by the second application. The second application or the remote attestation service may compare the additional information obtained from the remote attestation evidence with the first information obtained from the remote attestation report, to determine, based on the additional information and the first information obtained from the remote attestation report, whether the remote attestation report is from the first application. If the random number in the additional information is consistent with the random number in the first information, it indicates that the remote attestation report is from the first application, and a replay attack does not occur. If the random number in the additional information is inconsistent with the random number in the first information, it indicates that the remote attestation report is not from the first application, and a replay attack occurs. Therefore, the replay attack prevention can be implemented by setting the additional information.

In some embodiments, the remote attestation evidence comprises a remote attestation report and a log file in a startup stage of the first file. The method further comprises the following steps.

Step S801: obtain the second metric value based on the remote attestation report.

Step S803: obtain an intermediate metric value of the boot stage of the first file based on the log file, and calculating a fifth metric value based on the intermediate metric value.

In this embodiment, the log file in the bootup stage of the first file records events in the bootup stage of the first file. The bootup stage of the first file refers to an entire stage of loading the first file to boot an operating system in the virtual machine image file and deploy the first application. Because the kernel is measured in the bootup stage of the first file, the log file in the bootup stage of the first file records intermediate metric values in the bootup stage of the first file. Therefore, after obtaining the log file in the bootup stage of the first file, the second application or the remote attestation service may calculate the intermediate metric values in the bootup stage of the first file, and then reproduce the fifth metric value corresponding to the second metric value based on the intermediate metric values on the second application or the remote attestation service.

Verifying the first application based on the second metric value in step S107 includes: verifying the second metric value and the fifth metric value based on a predetermined verification policy, to obtain a remote attestation result for the first application.

In this embodiment, the second application or the remote attestation service may also directly perform the verification by using the second metric value and the fifth metric value, instead of reproducing the fourth metric value by using the code information for the first application running in the first trusted execution environment and the related information that are disclosed by the service provider, to obtain the remote attestation result for the first application.

In the foregoing embodiments, the second application or the remote attestation service may perform remote attestation on the first application based on a verification result of the second metric value and the fifth metric value, or may perform remote attestation on the first application based on a verification result of the second metric value and the fourth metric value, or may perform remote attestation on the first application based on a combination of the foregoing two manners. A specific remote attestation manner may be implemented based on a predetermined verification policy. This embodiment is not limited thereto.

In some embodiments, before obtaining the intermediate metric value of the boot stage of the first file based on the log file, and calculating the fifth metric value based on the intermediate metric value in step S803, the method further comprises: obtaining, by the second application or the remote attestation service, code information for the first application running in the first trusted execution environment and related information of the first file, and calculating first log information at system bootup based on the code information and the related information; determining whether the first log information is consistent with second log information in the log file; and in accordance with the first log information being consistent with the second log information in the log file, calculating the fifth metric value based on the log file.

In other words, in this embodiment, the second application or the remote attestation service may also calculate the first log information during system startup based on the code information for the first application running in the first trusted execution environment and the related information that are disclosed by the service provider, and compare the calculated first log information with the second log information in the log file. If the first log information is consistent with the second log information in the log file, it indicates that the log file is trusted, the fifth metric value may be calculated based on the log file, and the second metric value and the fifth metric value are verified based on the predetermined verification policy, to obtain the remote attestation result for the first application.

In some embodiments, the firmware (OVMF), the boot loader (Shim), the multiboot loader (Grub), the kernel (Kernel, including the kernel image itself and the command line of the kernel), and the initial root file system (initrd) are all measured and written into the register. In other words, the second metric value is not only a metric value generated by measuring the kernel, but also includes metric values obtained by measuring the firmware (OVMF), the boot loader (Shim), the multiboot loader (Grub), the kernel (Kernel, including the kernel image itself and the command line of the kernel), the initial root file system (initrd), and the like.

The second metric value may be only one metric value. For example, respective metric values are obtained after the firmware (OVMF), the boot loader (Shim), the multiboot loader (Grub), the kernel (Kernel, including the kernel image itself and the command line of the kernel), and the initial root file system (initrd) are respectively measured, and then the second metric value is obtained by performing further processing on the respective metric values.

The second metric value may be a combination of a plurality of metric values. Each metric value may be only a metric value obtained by measuring one of the firmware (OVMF), the boot loader (Shim), the multiboot loader (Grub), the kernel (Kernel, including the kernel image itself and the command line of the kernel), and the initial root file system (initrd), or may be a metric value obtained by performing further processing on respective metric values obtained by measuring a plurality of components. This embodiment is not limited thereto.

When the second metric value includes a combination of a plurality of metric values, the respective metric values may be stored in a same register or may be stored in different registers. This embodiment is not limited thereto.

In this embodiment, when the remote attestation is performed on the first application by using the second metric value, the obtained second metric value is not only a metric value generated by measuring the kernel, but also includes metric values obtained by measuring the firmware (OVMF), the boot loader (Shim), the multiboot loader (Grub), the kernel (Kernel, including the kernel image itself and the command line of the kernel), the initial root file system (initrd), and the like.

Correspondingly, when the service provider discloses the code information for the first application running in the first trusted execution environment, the code information includes information such as the firmware (OVMF), the boot loader (Shim), the multiboot loader (Grub), the kernel (Kernel, including the kernel image itself and the command line of the kernel), and the initial root file system (initrd).

In addition, when the second application or the remote attestation service calculates the fourth metric value based on the code information, the fourth metric value is also obtained by measuring information such as the firmware (OVMF), the boot loader (Shim), the multiboot loader (Grub), the kernel (Kernel, including the kernel image itself and the command line of the kernel), and the initial root file system (initrd).

In some embodiments, the method further includes the following steps:

Step S901: obtain an encryption block file.

Step S903: interact with a provider of the encryption block file by using an encryption storage service in the target file system to obtain a decryption key of the encryption block file.

The encryption block file may be provided by the service provider, and the provider of the encryption block file may be the service provider.

Step S905: decrypt the encryption block file based on the decryption key to obtain a decryption block file.

Step S907: mount the decryption block file in a system of the first trusted execution environment, and respond to a write request for the first application based on the decryption block file.

In this embodiment, because the target file system is read-only, the first application deployed in the first trusted execution environment can only respond to a read request, but cannot respond to a write request.

Therefore, in this embodiment, after the virtual machine is booted, the service provider further sends an encryption block file to the cloud service provider, and interacts with the cloud service provider based on the first storage service in the target file system, and verifies the first trusted execution environment. After the verification is passed, a secure communication channel may be established between the service provider and the first trusted execution environment, and the decryption key for the encryption block file is sent to the virtual machine through the secure communication channel. The virtual machine decrypts the encryption block file based on the decryption key, to obtain the decryption block file, and then mounts the decryption block file to the system of the first trusted execution environment, and responds to the write request for the first application by using the decryption block file. In this way, the first application running in the virtual machine has a partition that can be read from and written to securely, and secure read/write operations can be implemented.

It may be understood that before the technical solutions in the embodiments of the present disclosure are used, the user is informed of a type, a use scope, a use scenario, and the like of personal information involved in an appropriate manner, and the user's authorization is obtained.

For example, when a user's active request is received, prompt information is sent to the user, to clearly prompt the user that an operation that the user requests to perform needs to obtain and use the user's personal information. In this way, the user can independently select, based on the prompt information, whether to provide the personal information to software or hardware such as an electronic device, an application, a server, or a storage medium that performs an operation of the technical solution of the present disclosure.

As an optional but non-limiting implementation, the manner of sending the prompt information to the user in response to receiving the user's active request may be, for example, a pop-up window, and the pop-up window may present the prompt information in text. In addition, the pop-up window may further carry a selection control for the user to select "Agree" or "Disagree" to provide personal information to the electronic device.

It may be understood that the foregoing process of notifying and obtaining the user's authorization is merely illustrative and does not constitute a limitation on the implementation of the present disclosure. Other manners that meet relevant laws and regulations may also be applied to the implementation of the present disclosure.

It should be noted that the method of the embodiments of the present disclosure may be performed by a single device, for example, a computer or a server. The method of this embodiment may also be applied to a distributed scenario, and is completed by a plurality of devices cooperating with each other. In this distributed scenario, one of the plurality of devices may only perform one or more steps of the method of the embodiments of the present disclosure, and the plurality of devices will interact with each other to complete the method.

It should be noted that the foregoing describes some embodiments of the present disclosure. Other embodiments are within the scope of the appended claims. In some cases, actions or steps recited in the claims may be performed in an order different from that in the embodiments described above and still achieve expected results. In addition, the processes depicted in the accompanying drawings do not necessarily require a specific order or a sequential order to achieve the expected results. In some implementations, multitasking and parallel processing are also possible or may be advantageous.

Based on the same inventive concept, corresponding to the method in any of the foregoing embodiments, the present disclosure further provides an apparatus for remote attestation.

Figure 4:
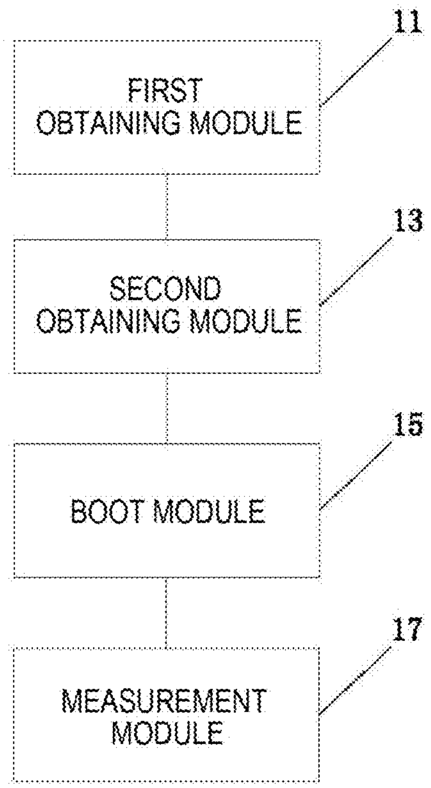
FIG. 4 shows a schematic diagram of an example apparatus according to an embodiment of the present disclosure.

Referring to FIG. 4, the apparatus includes:

- a first obtaining module 11 configured to obtain a first file for a first application, the first file being used to deploy the first application in a first trusted execution environment, and the first file comprising a read-only target file system;
- a second obtaining module 13 configured to obtain a first metric value for the target file system;
- a boot module 15 configured to load the first file, and write the first metric value into a command line for booting a kernel, and boot a kernel in the first file based on the command line, to deploy the first application in the first trusted execution environment; and
- a measurement module 17 configured to measure the kernel and other components to obtain a second metric value, and perform remote attestation on the first application based on the second metric value.

In some embodiments, the first file comprises a virtual machine image file, and the virtual machine image file comprises service information, component information for the first application, and environment information in which the first application runs.

In some embodiments, the target file system is a root file system.

In some embodiments, the boot module 15 is further configured to:

- verify the first metric value by the kernel; and
- measure the kernel in accordance with the first metric value being correct.

In some embodiments, verifying the first metric value by the kernel comprises:

- during a process of booting the kernel in the first file, measure the target file system in the first file to obtain a third metric value;
- determine whether the third metric value is the same as the first metric value; and
- determine that the first metric value is correct in accordance with the third metric value being the same as the first metric value.

In some embodiments, the measurement module 17 is further configured to:

- measure a kernel image of the kernel, the command line to generate the second metric value; and
- store the second metric value in a register matching the first trusted execution environment.

In some embodiments, the measurement module 17 is further configured to:

- receive a remote attestation request sent by a second application, the second application running in a second trusted execution environment;
- generate, based on the remote attestation request, remote attestation evidence comprising the second metric value; and
- send the remote attestation evidence to the second application or a remote attestation service, to cause the second application or the remote attestation service to obtain the second metric value from the remote attestation evidence, and verify the first application based on the second metric value.

In some embodiments, wherein the remote attestation evidence comprises a remote attestation report, the second metric value is stored in the remote attestation report; and the apparatus is further configured to:

- obtain, by the second application or the remote attestation service, code information for the first application running in the first trusted execution environment and related information of the first file, and obtaining a fourth metric value based on the code information and the related information, wherein a measurement method for the fourth metric value is the same as a measurement method for the second metric value; and
- verifying the first application based on the second metric value comprising:
- verifying the second metric value and the fourth metric value based on a predetermined verification policy, to obtain a remote attestation result for the first application.

In some embodiments, the remote attestation evidence comprises a remote attestation report and a log file of a boot stage of the first file, the second metric value is stored in the remote attestation report; and the apparatus is further configured to:

- obtain the second metric value based on the remote attestation report;
- obtain an intermediate metric value of the boot stage of the first file based on the log file, and calculating a fifth metric value based on the intermediate metric value; and
- verifying the first application based on the second metric value comprising:
- verifying the second metric value and the fifth metric value based on a predetermined verification policy, to obtain a remote attestation result for the first application.

In some embodiments, before obtaining the intermediate metric value of the boot stage of the first file based on the log file, and calculating the fifth metric value based on the intermediate metric value, the apparatus is further configured to:

- obtain, by the second application or the remote attestation service, code information for the first application running in the first trusted execution environment and related information of the first file, and calculating first log information at system bootup based on the code information and the related information;
- determine whether the first log information is consistent with second log information in the log file; and
- in accordance with the first log information being consistent with the second log information in the log file, calculating the fifth metric value based on the log file.

In some embodiments, the apparatus is further configured to:

obtain an encryption block file;

interact with a provider of the encryption block file by using an encryption storage service in the target file system to obtain a decryption key of the encryption block file;

decrypt the encryption block file based on the decryption key to obtain a decryption block file; and mount the decryption block file in a system of the first trusted execution environment, and responding to a write request for the first application based on the decryption block file.

For ease of description, the above apparatus is described above by dividing functions into various modules. Certainly, during implementation of the present disclosure, the functions of the modules may be implemented in one or more software and/or hardware.

The apparatus in the foregoing embodiments is configured to implement the corresponding method of remote attestation in any of the foregoing embodiments, and has beneficial effects of the corresponding method embodiment. Details are not described herein again.

Based on the same inventive concept, corresponding to the method in any of the foregoing embodiments, the present disclosure further provides an electronic device. The electronic device includes a memory, a processor, and a computer program stored in the memory and executable on the processor. When the processor executes the program, the method of remote attestation according to any one of the foregoing embodiments is implemented.

Figure 5:
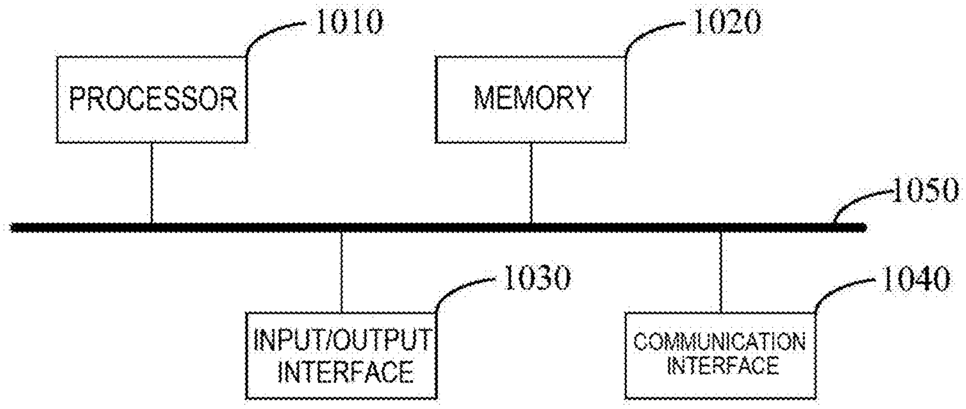
FIG. 5 shows a schematic diagram of a hardware structure of an example computer device according to an embodiment of the present disclosure.

FIG. 5 shows a schematic diagram of a more specific hardware structure of the electronic device according to this embodiment. The device may include a processor 1010, a memory 1020, an input/output interface 1030, a communication interface 1040, and a bus 1050. The processor 1010, the memory 1020, the input/output interface 1030, and the communication interface 1040 implement communication connection between each other in the device through the bus 1050.

The processor 1010 may be implemented by using a general-purpose CPU (Central Processing Unit), a microprocessor, an ASIC (Application Specific Integrated Circuit), or one or more integrated circuits, and is configured to execute a related program, to implement the technical solution provided in the embodiments of the present specification.

The memory 1020 may be implemented in a form of a ROM (Read Only Memory), a RAM (Random Access Memory), a static storage device, a dynamic storage device, or the like. The memory 1020 may store an operating system and other application programs. When the technical solution provided in the embodiments of the present specification is implemented by using software or firmware, related program code is stored in the memory 1020 and is called and executed by the processor 1010.

The input/output interface 1030 is configured to connect to an input/output module, to implement information input and output. The input/output module may be configured in the device as a component (not shown in the figure), or may be externally connected to the device to provide a corresponding function. The input device may include a keyboard, a mouse, a touch screen, a microphone, various sensors, and the like, and the output device may include a display, a speaker, a vibrator, an indicator light, and the like.

The communication interface 1040 is configured to connect to a communication module (not shown in the figure), to implement communication and interaction between this device and another device. The communication module may implement communication in a wired manner (for example, by using a USB cable or an Ethernet cable) or in a wireless manner (for example, by using a mobile network, WIFI, or Bluetooth).

The bus 1050 includes a path, and transmits information between components (for example, the processor 1010, the memory 1020, the input/output interface 1030, and the communication interface 1040) of the device.

It should be noted that although the foregoing device shows only the processor 1010, the memory 1020, the input/output interface 1030, the communication interface 1040, and the bus 1050, in an actual implementation process, the device may further include other components necessary for normal operation. In addition, a person skilled in the art may understand that the foregoing device may include only components necessary for implementing the solution of the embodiments of the present specification, instead of all the components shown in the figure.

The electronic device in the foregoing embodiment is configured to implement the corresponding method of remote attestation in any of the foregoing embodiments, and has beneficial effects of the corresponding method embodiment. Details are not described herein again.

Based on the same inventive concept, corresponding to the method in any of the foregoing embodiments, the present disclosure further provides a non-transitory computer-readable storage medium storing computer instructions, where the computer instructions are configured to enable the computer to perform the method of remote attestation according to any one of the foregoing embodiments.

The computer-readable medium in this embodiment includes a permanent and non-permanent, and removable and non-removable medium, and may implement information storage by using any method or technology. The information may be computer-readable instructions, a data structure, a program module, or other data. Examples of the computer storage medium include, but are not limited to, a phase change memory (PRAM), a static random access memory (SRAM), a dynamic random access memory (DRAM), another type of random access memory (RAM), a read-only memory (ROM), an electrically erasable programmable read-only memory (EEPROM), a flash memory, or another memory technology, a compact disc read-only memory (CD-ROM), a digital versatile disc (DVD), or another optical storage, a magnetic cassette, a magnetic tape, a magnetic disk storage, or another magnetic storage device, or any other non-transmission medium, and may be used to store information that can be accessed by a computing device.

The computer instructions stored in the storage medium in the foregoing embodiment are configured to enable the computer to perform the method of remote attestation according to any one of the foregoing embodiments, and have beneficial effects of the corresponding method embodiment. Details are not described herein again.

A person of ordinary skill in the art should understand that the discussions of any of the foregoing embodiments are exemplary only, and are not intended to imply that the scope of the present disclosure (including the claims) is limited to these examples; under the concept of the present disclosure, the technical features in the foregoing embodiments or in different embodiments may also be combined, and the steps may be implemented in any order, and there are many other variations of different aspects of the embodiments of the present disclosure as described above, which are not provided in detail for the sake of brevity.

In addition, to simplify the description and discussion, and not to make the embodiments of the present disclosure difficult to understand, well-known power/ground connections to integrated circuit (IC) chips and other components may be shown or may not be shown in the provided figures. In addition, the apparatus may be shown in the form of a block diagram, in order to avoid making the embodiments of the present disclosure difficult to understand, and this also takes into account the following fact: details of the implementation of these block diagram apparatuses are highly dependent on the platform on which the embodiments of the present disclosure are to be implemented (that is, the details should be completely within the understanding of those skilled in the art). In the case where specific details (for example, a circuit) are set forth in order to describe the exemplary embodiments of the present disclosure, it will be apparent to those skilled in the art that the embodiments of the present disclosure may be implemented without these specific details or with changes to these specific details. Therefore, the descriptions should be considered as illustrative rather than restrictive.

Although the present disclosure has been described in conjunction with specific embodiments of the present disclosure, many alternatives, modifications, and variations of these embodiments will be apparent to those of ordinary skill in the art based on the foregoing description. For example, other memory architectures (for example, a dynamic RAM (DRAM)) may use the embodiments discussed.

The embodiments of the present disclosure are intended to cover all such alternatives, modifications, and variations that fall within the broad scope of the appended claims. Therefore, any omission, modification, equivalent replacement, improvement, etc. made within the spirit and principle of the embodiments of the present disclosure shall be included within the protection scope of the present disclosure.

We claim:

1. A method of remote attestation, applied to a first trusted execution environment, the method comprising:

obtaining a first file for a first application, the first file being used to deploy the first application in the first trusted execution environment, and the first file comprising a read-only target file system;

obtaining a first metric value for the target file system;

loading the first file, and writing the first metric value into a command line for booting a kernel, and booting a kernel in the first file based on the command line, to deploy the first application in the first trusted execution environment; and measuring the kernel and other components to obtain a second metric value, and performing remote attestation on the first application based on the second metric value, wherein performing the remote attestation on the first application based on the second metric value comprises:

receiving a remote attestation request sent by a second application, the second application running in a second trusted execution environment;

generating, based on the remote attestation request, remote attestation evidence comprising the second metric value; and sending the remote attestation evidence to the second application or a remote attestation service, to cause the second application or the remote attestation service to obtain the second metric value from the remote attestation evidence, and verify the first application based on the second metric value.

2. The method according to claim 1, wherein the first file comprises a virtual machine image file, and the virtual machine image file comprises service information, component information for the first application, and environment information in which the first application runs.

3. The method according to claim 1, wherein the target file system is a root file system.

4. The method according to claim 1, wherein booting, based on the command line, the kernel in the first file comprises:

verifying the first metric value by the kernel; and measuring the kernel in accordance with the first metric value being correct.

5. The method according to claim 4, wherein verifying the first metric value by the kernel comprises:

during a process of booting the kernel in the first file, measuring the target file system in the first file to obtain a third metric value;

determining whether the third metric value is the same as the first metric value; and determining that the first metric value is correct in accordance with the third metric value being the same as the first metric value.

6. The method according to claim 1, wherein measuring the kernel and the other components to obtain the second metric value comprises:

measuring a kernel image of the kernel, the command line and the other components to generate the second metric value, the second metric value comprising one metric value or a combination of a plurality of metric values; and storing the second metric value in a register matching the first trusted execution environment.

7. The method according to claim 1, wherein the remote attestation evidence comprises a remote attestation report, the second metric value is stored in the remote attestation report, the method further comprises:

obtaining, by the second application or the remote attestation service, code information for the first application running in the first trusted execution environment and related information of the first file, and obtaining a fourth metric value based on the code information and the related information, wherein a measurement method for the fourth metric value is the same as a measurement method for the second metric value; and verifying the first application based on the second metric value comprising:

verifying the second metric value and the fourth metric value based on a predetermined verification policy, to obtain a remote attestation result for the first application.

8. The method according to claim 1, wherein the remote attestation evidence comprises a remote attestation report and a log file of a boot stage of the first file, the second metric value is stored in the remote attestation report, the method further comprises:

obtaining the second metric value based on the remote attestation report;

obtaining an intermediate metric value of the boot stage of the first file based on the log file, and calculating a fifth metric value based on the intermediate metric value;

verifying the first application based on the second metric value comprising:

verifying the second metric value and the fifth metric value based on a predetermined verification policy, to obtain a remote attestation result for the first application.

9. The method according to claim 8, wherein before obtaining the intermediate metric value of the boot stage of the first file based on the log file, and calculating the fifth metric value based on the intermediate metric value, the method further comprises:

obtaining, by the second application or the remote attestation service, code information for the first application running in the first trusted execution environment and related information of the first file, and calculating first log information at system bootup based on the code information and the related information;

determining whether the first log information is consistent with second log information in the log file; and in accordance with the first log information being consistent with the second log information in the log file, calculating the fifth metric value based on the log file.

10. The method according to claim 1, further comprising:

obtaining an encryption block file;

interacting with a provider of the encryption block file by using an encryption storage service in the target file system to obtain a decryption key of the encryption block file;

decrypting the encryption block file based on the decryption key to obtain a decryption block file; and mounting the decryption block file in a system of the first trusted execution environment, and responding to a write request for the first application based on the decryption block file.

11. An electronic device, comprising a memory, a processor, and a computer program stored in the memory and executable on the processor, wherein the program, when executed by the processor, implements the method of claim 1, applied to a first trusted execution environment.

12. The electronic device of claim 11, wherein the first file comprises a virtual machine image file, and the virtual machine image file comprises service information, component information for the first application, and environment information in which the first application runs.

13. The electronic device of claim 11, wherein the target file system is a root file system.

14. The electronic device of claim 11, wherein booting, based on the command line, the kernel in the first file comprises:

verifying the first metric value by the kernel; and measuring the kernel in accordance with the first metric value being correct.

15. The electronic device of claim 14, wherein verifying the first metric value by the kernel comprises:

during a process of booting the kernel in the first file, measuring the target file system in the first file to obtain a third metric value;

determining whether the third metric value is the same as the first metric value; and determining that the first metric value is correct in accordance with the third metric value being the same as the first metric value.

16. The electronic device of claim 11, wherein measuring the kernel and the other components to obtain the second metric value comprises:

measuring a kernel image of the kernel, the command line and the other components to generate the second metric value, the second metric value comprising one metric value or a combination of a plurality of metric values; and storing the second metric value in a register matching the first trusted execution environment.

17. The electronic device of claim 11, wherein the remote attestation evidence comprises a remote attestation report, the second metric value is stored in the remote attestation report, the method further comprises:

obtaining, by the second application or the remote attestation service, code information for the first application running in the first trusted execution environment and related information of the first file, and obtaining a fourth metric value based on the code information and the related information, wherein a measurement method for the fourth metric value is the same as a measurement method for the second metric value; and verifying the first application based on the second metric value comprising:

verifying the second metric value and the fourth metric value based on a predetermined verification policy, to obtain a remote attestation result for the first application.

18. A method of remote attestation, applied to a first trusted execution environment, the method comprising:

obtaining a first file for a first application, the first file being used to deploy the first application in the first trusted execution environment, and the first file comprising a read-only target file system;

obtaining a first metric value for the target file system;

loading the first file, and writing the first metric value into a command line for booting a kernel, and booting a kernel in the first file based on the command line, to deploy the first application in the first trusted execution environment, wherein booting, based on the command line, the kernel in the first file comprises:

verifying the first metric value by the kernel; and measuring the kernel in accordance with the first metric value being correct; and measuring the kernel and other components to obtain a second metric value, and performing remote attestation on the first application based on the second metric value, wherein verifying the first metric value by the kernel comprises:

during a process of booting the kernel in the first file, measuring the target file system in the first file to obtain a third metric value;

determining whether the third metric value is the same as the first metric value; and determining that the first metric value is correct in accordance with the third metric value being the same as the first metric value.

19. A method of remote attestation, applied to a first trusted execution environment, the method comprising:

obtaining a first file for a first application, the first file being used to deploy the first application in the first trusted execution environment, and the first file comprising a read-only target file system;

obtaining a first metric value for the target file system;

loading the first file, and writing the first metric value into a command line for booting a kernel, and booting a kernel in the first file based on the command line, to deploy the first application in the first trusted execution environment; and measuring the kernel and other components to obtain a second metric value, and performing remote attestation on the first application based on the second metric value;

obtaining an encryption block file;

interacting with a provider of the encryption block file by using an encryption storage service in the target file system to obtain a decryption key of the encryption block file;

decrypting the encryption block file based on the decryption key to obtain a decryption block file; and mounting the decryption block file in a system of the first trusted execution environment, and responding to a write request for the first application based on the decryption block file.

* * * * *